US005642293A

United States Patent [19]
Manthey et al.

[11] Patent Number: 5,642,293
[45] Date of Patent: Jun. 24, 1997

[54] METHOD AND APPARATUS FOR DETERMINING SURFACE PROFILE AND/OR SURFACE STRAIN

[75] Inventors: David W. Manthey, Troy; Daeyong Lee, Loudonville, both of N.Y.

[73] Assignee: CamSys, Inc., Troy, N.Y.

[21] Appl. No.: 656,839

[22] Filed: Jun. 3, 1996

[51] Int. Cl.$^6$ .................................................. G06K 9/00
[52] U.S. Cl. ......................... 364/508; 382/141; 382/285; 395/119; 395/120; 395/123; 395/124; 395/129; 364/559
[58] Field of Search ................................. 364/508, 559; 382/285, 141; 395/119, 120, 123–124, 129; 348/125, 129, 131

[56] References Cited

U.S. PATENT DOCUMENTS 4,969,106  11/1990  Vogel et al. .............................. 364/508

OTHER PUBLICATIONS

Publication printed in The Journal of The Minerals, Metals & Materials Society, titled "The Automated Measurement of Strains from Three–Dimensional Deformed Surfaces", Authors–J.H. Vogel and D. Lee; vol. 42, No. 2, Feb. 1990, p. 8–13.

Publication in SAE (The Engineering Society For Advancing Mobility Land Sea Air and Space) Technical Paper Series 920436, Feb. 1992, pp. 73–85; titled "Comparison of Different Surface Strain Measurement Methods Used for Deformed Sheet Metal Parts"; Authors: M.L Kapij, CamSys, Inc; Moleski, General Motors Research Labs.; T. Ohwuc, Nippon Steel Corp.; J.H. Vogel, University of Minnesota; D. Lee, Rensselaer Polytechnic Institute; Reprinted from: Autobody Stamping Applications and Analysis (SP–897).

Publication in Body Assembly & Manufacturing, IBEC '93, pp. 106–111, titled "Comparison of Different Strain Measurement Techniques Used For Stamped Sheet Metal Parts" by David W. Manthey, Rebecca M. Bassett, CamSys, Inc. and Daeyong Lee, Rensselaer Polytechnic Institute.

Publication in Nov. 1994 Issue of Production by Dr. Ing Karl Hermann Breyer and Dr. Ing Rainer Ohnheiser, Carl Zeiss, Oberkochen, Germany, titled "Length and Form Measurement on Coordinate Measuring Machines", pp. 38–43.

Publication in American Machinist, Aug. 1989, pp. 42–50, by Frederick Mason, titled "Ways to inspect jet–engine blades".

Publication in Computer Graphics and Image Processing, vol, 17, pp. 130–144, published in 1981, titled "Pattern Thinning By Contour Tracing", Author: Carlo Arcelli.

Publication titled "A Computer Program For Direct Linear Transformation Solution Of The Colinerity Condition, And Some Applications Of It;" Authors: Genaro T. Marzan and Dr. H.M. Karara.

Publication titled "Medial Lines and Figure Analysis", Authors: Carlo Arcelli and Gabriella Sanniti di Baja, Instituto di Cibernetica, C.N.R, 80072 Arco Felice, Naples, Italy.

*Primary Examiner*—Emanuel T. Voeltz
*Assistant Examiner*—Hien Vo
*Attorney, Agent, or Firm*—Heslin & Rothenberg, P.C.; Wayne F. Reinke, Esq.

[57] ABSTRACT

A photogrammetry target (cube or other shape of known dimension with reference points in known relation to each other) is placed on or in close proximity to a surface for which surface profile and/or surface strain are to be measured. Identifiable reference points are applied to the surface of interest, and multiple images of the surface with photogrammetry target are taken. At least some of the reference points on the photogrammetry target and the surface of interest must be visible in each image. The surface profile and/or surface strain are determined from the images based on the reference points therein. The determination is made by determining two-dimensional coordinates for each visible reference point in each image, correlating the two-dimensional coordinates for the images, determining, for each image, a distance between a vantage point for obtaining the image and the photogrammetry target, and determining, for each image, three-dimensional coordinates for each visible reference point on the surface of interest based on the correlated two-dimensional coordinates and the determined distance. The images are obtained by a digital camera, and the surface profile and/or surface strain determination is made by a computer.

21 Claims, 5 Drawing Sheets

METHOD AND APPARATUS FOR DETERMINING SURFACE PROFILE AND/OR SURFACE STRAIN

This application claims the benefit of U.S. Provisional Application No. 60/008,039, filed Oct. 30, 1995.

BACKGROUND OF THE INVENTION

1. Technical Field

The present invention generally relates to characterizing object surfaces. More particularly, the present invention relates to a method and apparatus for vision-based determination of surface profile and/or surface strain.

2. Background Information

In the past, vision-based approaches to surface profile and/or surface strain measurements have focused on the problem of automating such measurements. However, an emphasis has not been placed on the portability of equipment used to make such measurements. Such equipment has been stationary, since knowledge of the vantage points from which images of the surface of interest are obtained is needed. Such stationary systems may not be practical for some purposes.

Thus, a need exists for an improved vision-based approach to surface profile and/or surface strain measurement with portable equipment.

SUMMARY OF THE INVENTION

Briefly, the present invention satisfies the need for an improved vision-based approach to determining surface profile and/or surface strain with portable equipment by providing a photogrammetry target placed on or in close proximity to the surface of interest prior to obtaining images thereof. Since the dimensions of the photogrammetry target are known, and the target includes known reference points, the need for stationary equipment is eliminated.

In accordance with the above, it is an object of the present invention to provide a vision-based approach to determining attributes of a surface of interest.

It is another object of the present invention to provide a vision-based approach to determining an attribute of a surface without knowledge of the location of the image-obtaining equipment with respect to the surface of interest.

It is a further object of the present invention to provide portable apparatus for a vision-based approach to determining an attribute of a surface.

The present invention provides, in a first aspect, a method of determining an attribute of a surface. The method comprises steps of applying a first plurality of identifiable reference points to the surface, placing a photogrammetry target on or in close proximity to the surface, the photogrammetry target including a second plurality of identifiable reference points, obtaining at least two images of the surface with the photogrammetry target, each image including at least some of the first and second plurality of reference points, and determining, from the at least two images, the attribute based on the reference points included in the images.

The present invention provides, in a second aspect, apparatus for determining an attribute of a surface, comprising means for applying a first plurality of identifiable reference points to the surface, a photogrammetry target for placing on or in close proximity to the surface, the photogrammetry target including a second plurality of identifiable reference points, means for obtaining at least two images of the surface with the photogrammetry target, each image including at least some of the first and second plurality of reference points and having a different orientation, and means for determining, from the images, the attribute based on the reference points in the images.

These, and other objects, features and advantages of this invention will become apparent from the following detailed description of the various aspects of the invention taken in conjunction with the accompanying drawings.

BEST MODE FOR CARRYING OUT THE INVENTION

A vision-based surface strain and surface profile or geometry measurement method has been used successfully in the past. See U.S. Pat. No. 4,969,106, entitled "Computerized Method of Determining Surface Strain Distributions in a Deformed Body," issued to Vogel et al. on Nov. 6, 1990, which is herein incorporated by reference in its entirety (hereinafter, "the Vogel patent"). In the Vogel patent, a grid is applied to the surface of a metal part before deformation. An automated system including a stationary video camera then takes two photographs of the part surface. The system includes special positioning hardware allowing the camera position relative to the part to be known for each photograph. In addition, the internal camera parameters must be known (e.g., focal length, camera lens size, film size, and location of film with respect to the lens). Corresponding points on the surface grid are identified between the two-dimensional photographs, and three-dimensional coordinates for those points are calculated based on the known camera positions. The three-dimensional coordinates of all the intersecting points are computed using a triangulation method, and the surface strain is determined from the final coordinates of all the intersecting points and the initial size of the grid.

The present invention presents a different approach to determining surface attributes, such as surface profile and strain. Knowledge of the vantage points from which the images are obtained is not needed prior to obtaining the images, nor is knowledge of the internal image-obtaining equipment parameters. Further, the image-obtaining equipment need not be stationary and, therefore, the system is portable. A photogrammetry target is included in each image to determine the location of the image-obtaining equipment and to determine the internal parameters thereof. As used herein, the term "photogrammetry target" refers to an object of known dimensions with a plurality of identifiable reference points.

Figure 1:
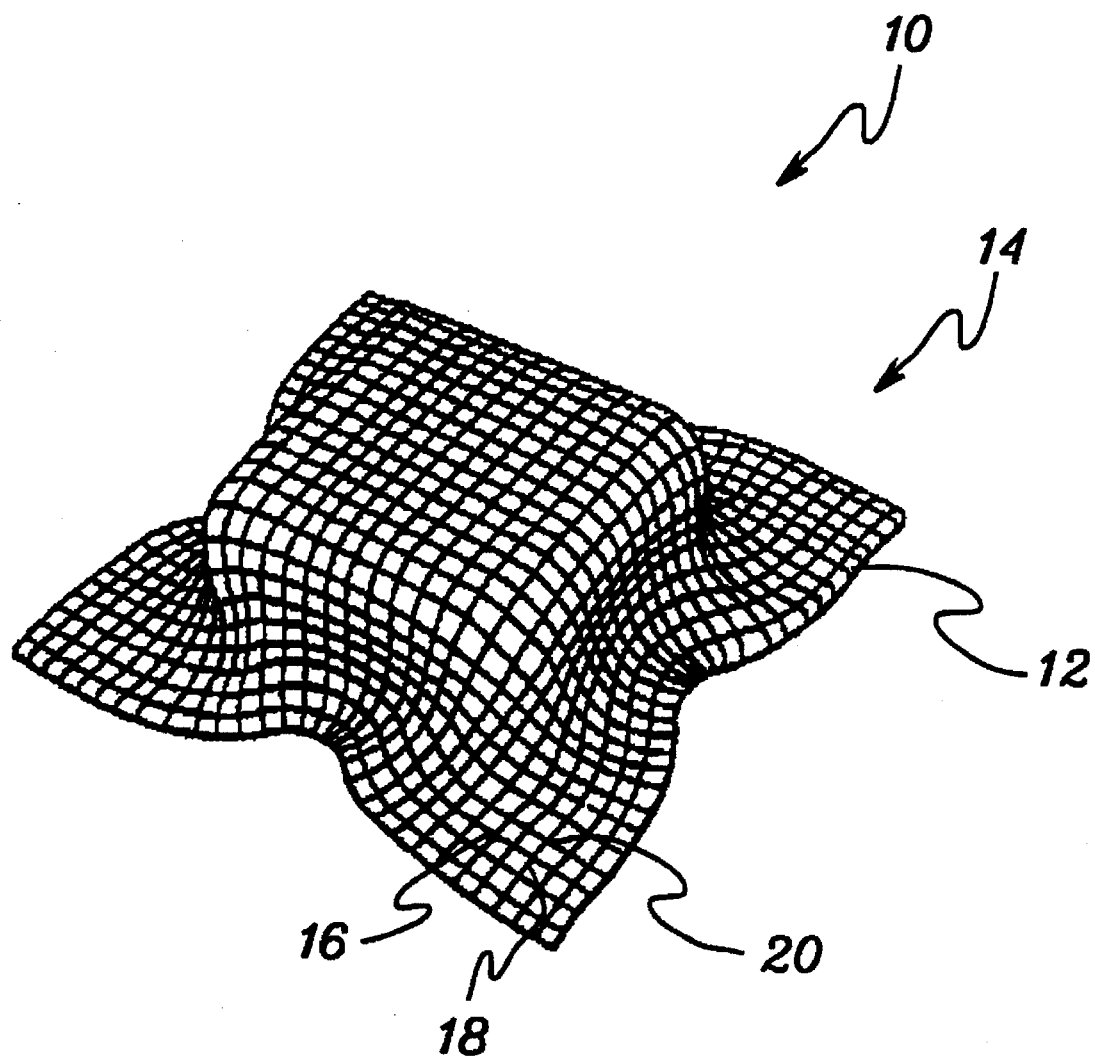
FIG. 1 is a perspective view of a piece of steel formed into a part with a square grid placed on the surface thereof prior to deformation.

FIG. 1 depicts a part 10 made by deforming sheet metal. Prior to deformation, sheet metal 12 was flat and a uniform square grid 14 was printed thereon. Grid 14 includes a plurality of intersecting lines, e.g., lines 16 and 18. As referred to herein, the term "grid point" will refer to the intersection of grid lines, e.g., point 20 in FIG. 1. It will be understood that, although a square grid is depicted herein, other types of grid pattern could be used with the surface of interest, such as, for example, a circular grid pattern (i.e., circles lined up in rows and columns), a radial grid pattern, or a non-uniform grid pattern. In fact, a grid is not required, so long as identifiable reference points are present. However, where an irregular grid pattern is used, automatic location of the target may not be possible.

Figure 2:
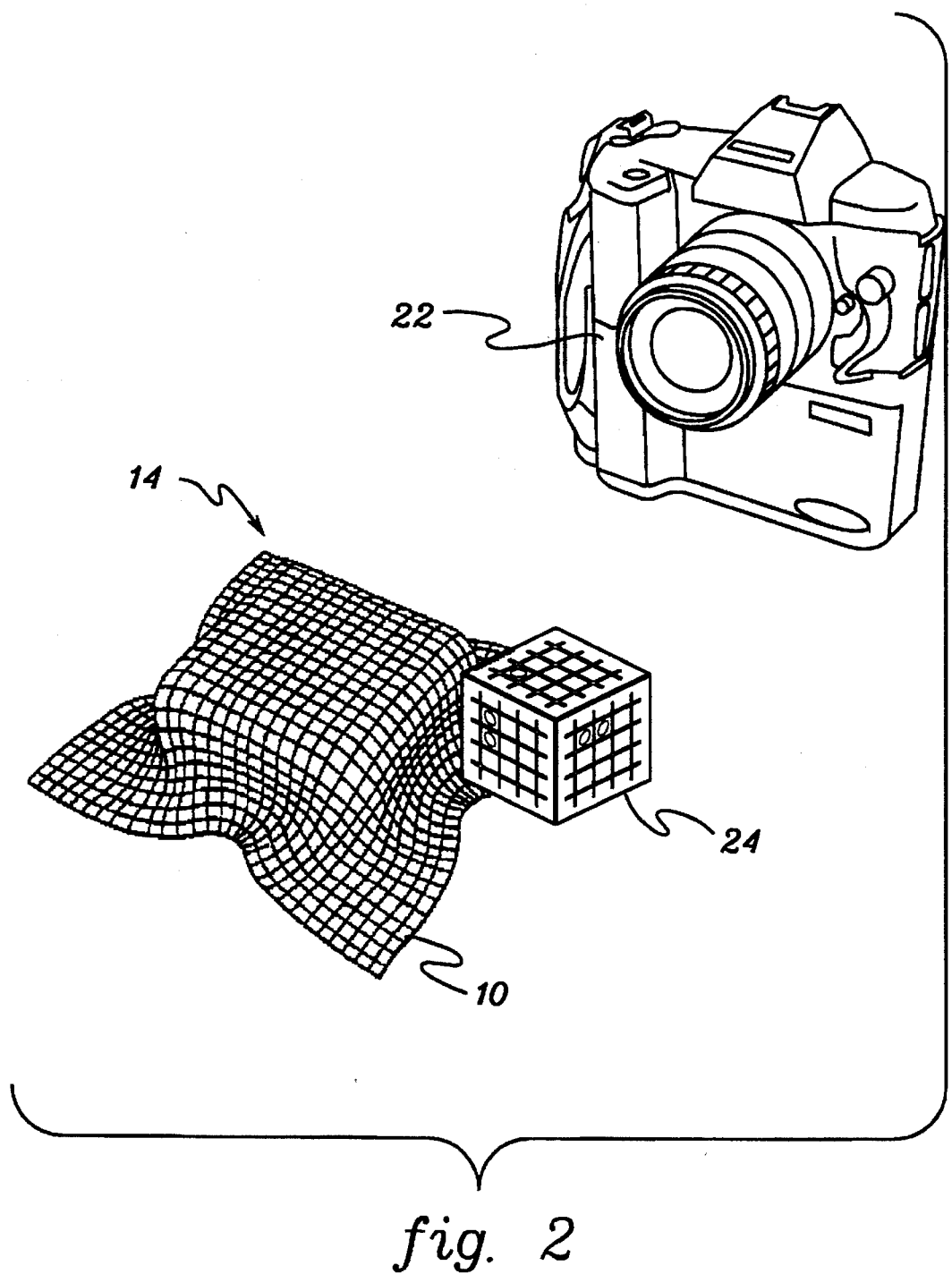
FIG. 2 depicts the part of FIG. 1 together with apparatus for determining an attribute of the part surface according to the present invention.
Figure 3:
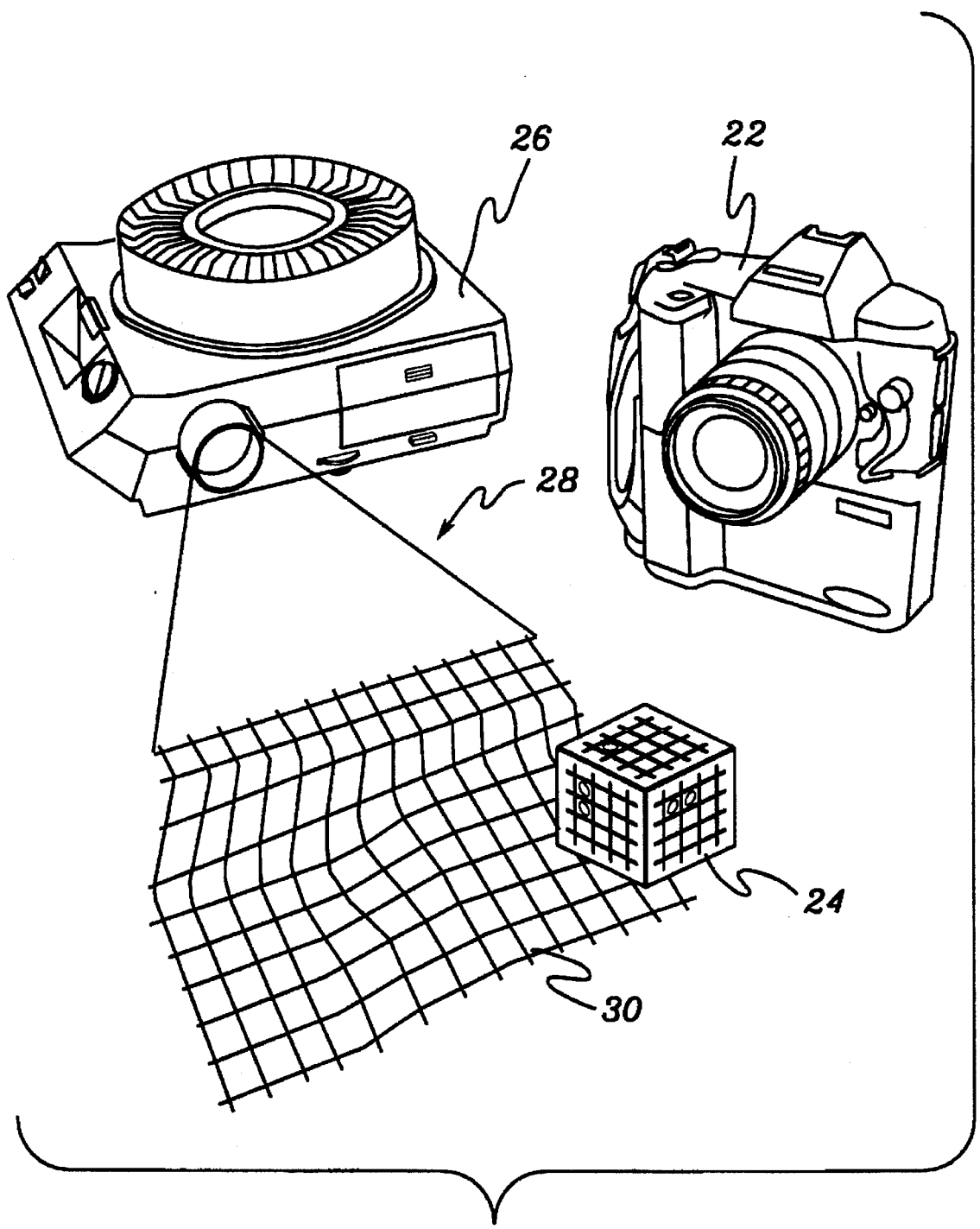
FIG. 3 depicts apparatus similar to that of FIG. 2, except that the square grid is projected onto the surface of a part.

FIG. 2 depicts part 10 along with exemplary apparatus according to the present invention. The apparatus includes digital camera 22 and photogrammetry target 24. Alternative exemplary apparatus is depicted in FIG. 3. Shown there is camera 22 and photogrammetry target 24 of FIG. 2, along with slide projector 26 projecting an image 28 of a grid pattern onto a deformed surface 30.

FIGS. 2 and 3 merely show different ways to apply a grid pattern to the surface of interest. In this context, the term "apply" or "applying" encompasses both physical and non-physical methods. Regardless of the manner in which a grid pattern is applied, the photogrammetry target is placed near the surface of interest (in this case, the surface of part 10 or surface 30). At least two images of the surface and target are then obtained, with the surface and target oriented differently in each image. Here, digital camera 22 is used to obtain a first digital photograph from a first vantage point, and then a second digital photograph is taken from a second vantage point. At least two sides of the target must be present in each image in order to determine the three-dimensional coordinates of all the relevant intersecting points using a triangulation method. In addition, the target cannot be moved with respect to the surface between images. Although not preferred, the image-obtaining equipment could be stationary, and the surface of interest and target rotated, for example, using equipment similar to that described in the Vogel patent. The more stationary equipment that is used, the less portable the system becomes.

Digital camera 22 could be, for example, a KODAK® DCS420c digital camera, and comprises a single lens reflex camera with a special databack. The databack comprises a CCD (charge-coupled device) chip to digitize the image seen through the camera lens. After digitizing the image, which could be, for example, 1536 ×1024 pixels in size, the pixel data is stored for later use. Alternatively, a conventional photograph could be taken (e.g., with a film camera or a video camera) and itself digitized. However, a digital camera is preferred over a conventional camera with digitizing equipment (e.g., scanner). Although digitizing enables the use of a computer, and is preferred, digitizing and the use of a computer are not necessary to practice the present invention. Entirely analog methods could be used, including doing computations by hand. The present invention is intended to encompass any manner of obtaining an image, and, in the preferred embodiment, any manner of obtaining a digital image of the surface of interest and photogrammetry target.

Figure 4:
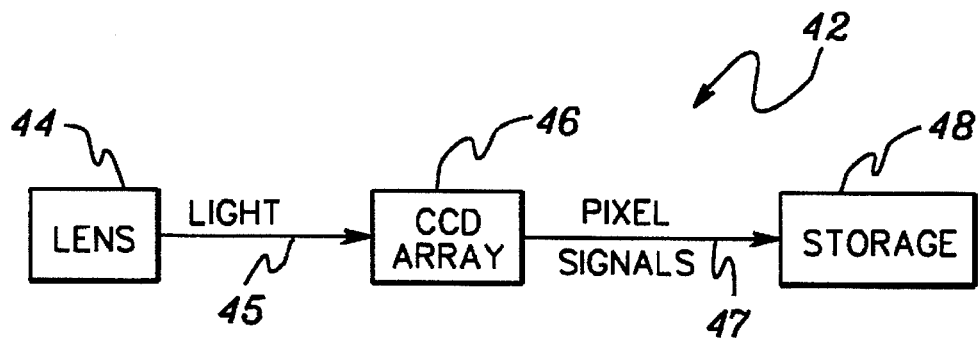
FIG. 4 depicts the photogrammetry target of FIGS. 2 and 3 in detail.

Referring now to FIG. 4, a block diagram 42 is shown of the major portions of digital camera 22. Included are lens 44, CCD array 46, and storage 48. Assume that lens 44 has a field of view of 150 mm. As a photograph is taken, light 45 from lens 44 impinges on CCD array 46, which creates pixel signals 47 representing the image in digital form. Finally, the signals are stored as 1's and 0's in storage 48, which could be, for example, a hard drive accepting removable media cards and formatted in a standard manner.

Figure 5:
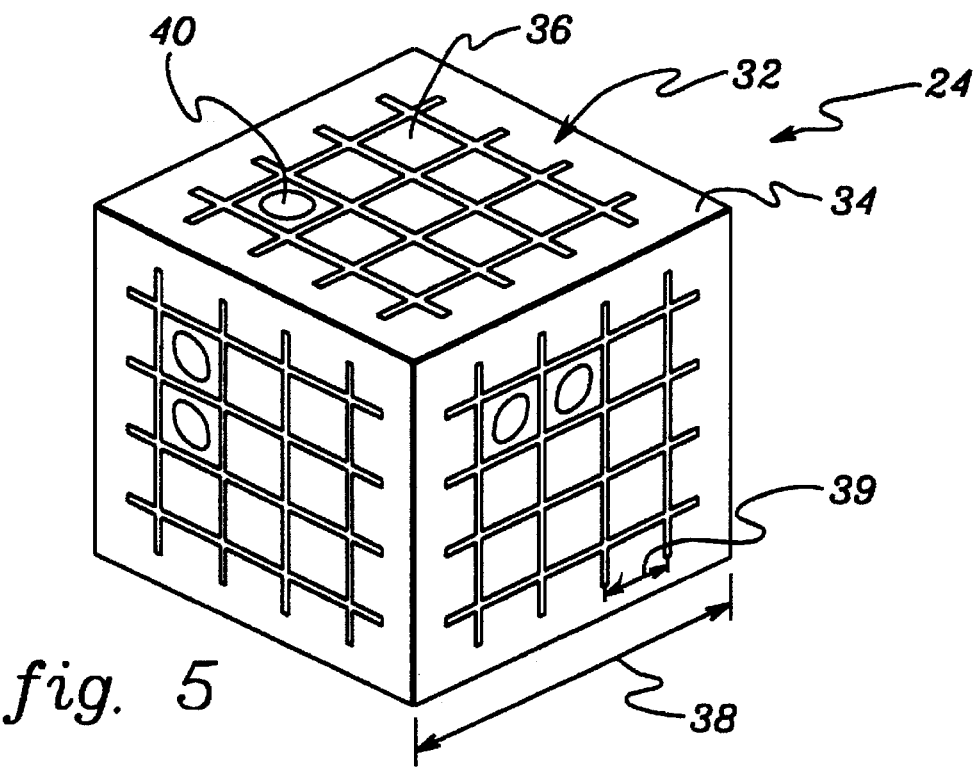
FIG. 5 is a block diagram of the major components of the digital camera of FIGS. 2 and 3.

Slide projector 26 is a conventional carousel-type slide projector. However, it will be understood that other image projecting equipment could be used, such as, for example, any equipment including a source of light and an image medium through which the light passes. FIG. 5 depicts photogrammetry target 24 in detail. Target 24 is cube-shaped with 25 mm dimensions (distance 38 is 25 mm) and has a square grid on each face, e.g., grid 32 on top face 34, each grid square having 5 mm dimensions (distance 39 is 5 mm). Although described as having a cube shape, it will be understood that the target could be other geometric shapes, such as, for example, a pyramid, a rectangular bar, a cylinder, a toroid, a sphere, a wedge, a cone, a dodecahedron, a tetrahedron, an octahedron, a hexahedron, a right rectangular prism, a right triangular prism, a right hexagonal prism, a right triangular pyramid, a right hexagonal pyramid, a frustrum of a right cone, etc. In fact, the target could even be a wire frame shape instead of solid. In addition, it will be understood that the target could be larger or smaller than that described herein. Grid 32 is referred to as "square", since the grid lines thereof form a matrix of squares (here, a 3×3 matrix), e.g., square 36. Grid 32 has 16 grid points; that is, 16 points at which the grid lines intersect. A square grid was chosen, since it will be easily identified by a computer used to analyze the images (use of a computer is preferred), although other types could be used. Each face has one or more dots, e.g., dot 40 on face 34, that uniquely identifies that face. In addition, at least six visible grid points of known position with respect to each other must be present in order to determine the internal and external parameters of digital camera 22, and the known grid points cannot all be coplanar.

The 11 standard camera parameters are: position (with respect to the target), which has three values; orientation, which also has three values (i.e., the direction the camera is pointing with respect to the coordinate system; three angles, usually referred to as θ, Φ and Ψ); lens focal length; film size, which has two values; and the film center with respect to the center of the lens, which also has two values. Each reference point on the target provides two coordinates, and, hence, two constraints. A total of 11 constraints are needed, so that at least six reference points are needed on the target, which must not all be coplanar. If all the points were coplanar, the photogrammetry equations would contain a singularity and could not be solved. However, as many as five of the six reference points could be coplanar and still allow the equations to be solved. Where more known grid points are visible in a given image, a least-square process can be employed to improve accuracy. However, the more grid points that are used, the more difficult it will be for a computer to identify the grid. A grid with 16 grid points on each face was chosen as a reasonable compromise.

Photogrammetry target 24 could be made of any opaque material, for example, a black polymer (e.g., LEXAN® made by the General Electric Company), or from metal (e.g., aluminum). Preferably, the grid lines are printed by machining grooves into the target using a standard milling machine or computer controlled milling machine, and then filled in with a wax of contrasting color. However, one skilled in the art will recognize that the grid lines could be printed any number of other ways, for example, with a laser. The target is preferably about twice as accurate as the digital image, or the target will be the limiting factor in overall system accuracy. This means, for example, that if the image were 1536 pixels across, the target is preferably accurate to one part in 1536×2=3072. For photogrammetry target 24, this is roughly 8 μm. Regardless of how the target is made, the goal is to have the grid and identifying markings easily discernable from the target body.

In some manner, the digital photograph data obtained by the digital camera of the surface and target are preferably transferred to a computer for analysis. As an example, if the storage mechanism is a hard drive using removable media cards storing data, the relevant media card(s) could be removed and inserted into a computer hard drive compatible therewith (e.g., many notebook computers accept such media cards).

Figure 6:
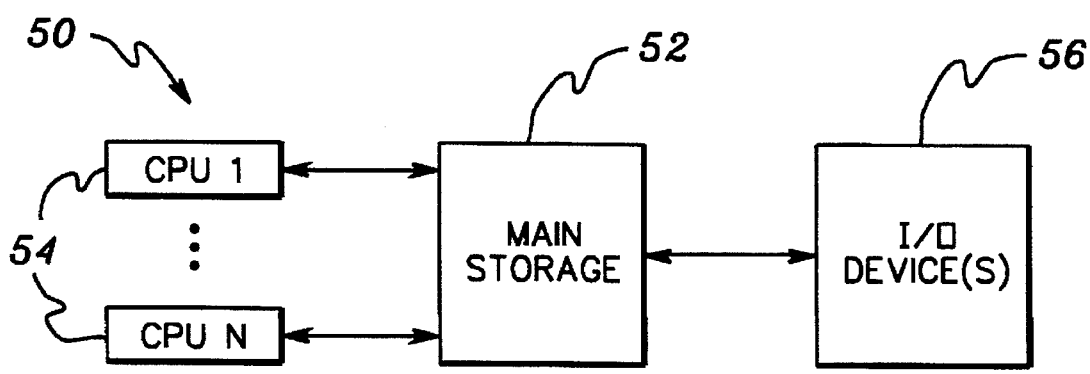
FIG. 6 is a block diagram of a computer useful with the present invention.

FIG. 6 is a general block diagram of an exemplary computer 50 useful with the present invention. Computer 50 includes, for example, a main storage 52, one or more central processing units 54, and one or more I/O devices 56. Central processing units 54 contain the sequencing and processing facilities for instruction execution, interruption action, timing function, initial program loading and other machine-related functions. In one embodiment, one or more of central processing units 54 executes an operating system controlling the execution of programs running within the computer and stored in main storage 52. Central processing units 54 are coupled via, for example, one or more bi-directional buses to main storage 52. Main storage 52 is directly addressable and provides for high-speed processing of data by the central processing units. Main storage 52 can be physically integrated with the CPU's or constructed as stand-alone units. Main storage 52 is further coupled via, for example, a bi-directional bus to I/O device(s) 56. I/O device(s) 56 may include, for example, a keyboard, a monitor, a mouse or other pointing device, external storage media and/or optical devices, to name a few.

Figure 7:
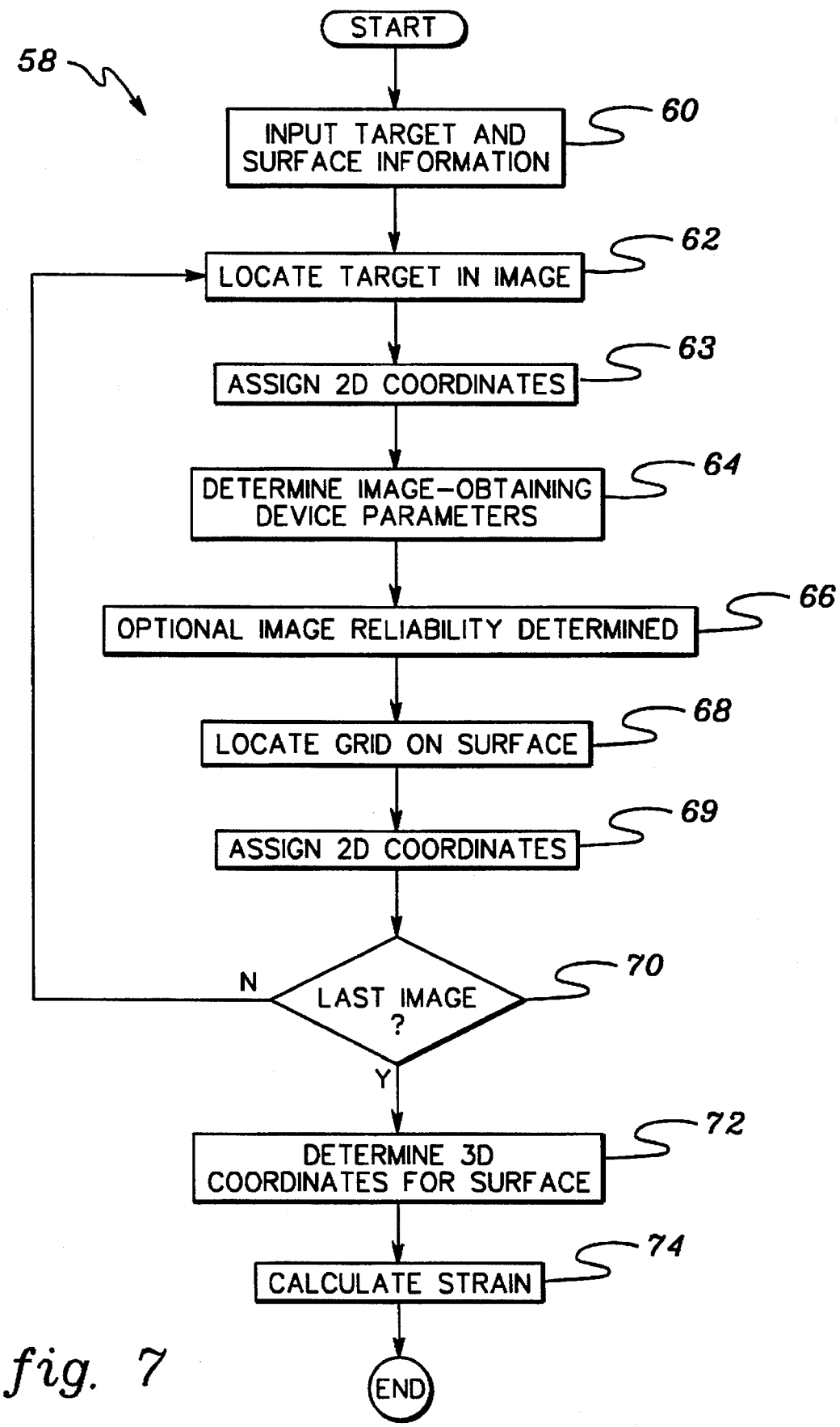
FIG. 7 is a flow diagram for a computer program in a accordance with the present invention used with the computer of FIG. 6.

After the data representing the images is transferred to a computer, a computer program analyzes the data. An exemplary computer program will now be described with reference to flow diagram 58 of FIG. 7 and the apparatus of FIG. 2. Flow diagram 58 tracks the major steps in the exemplary computer program, and serves to track the steps of the present inventive method. The exemplary program assumes a cube-shaped target, a square grid used on the target and the surface of interest, and that the KODAK® digital camera referred to above will be used. The user first specifies the size or dimensions of the target. In this case, the user would input "25 mm" (one edge of the cube) for the size of the target when prompted to do so. In addition, for measuring surface strain, the size of the grid pattern on the surface of interest is also supplied (STEP 60, "INPUT TARGET AND SURFACE INFORMATION"). In this case, the user would input "5 mm" (one side of a square within the grid pattern) for the size or dimensions of grid pattern 14 in FIG. 2 when prompted to do so.

After the user inputs the needed target and surface information, the image data is processed for a first image in order to locate the photogrammetry target 24 (STEP 62, "LOCATE TARGET IN IMAGE"). In the present exemplary program, locating the target involves first filtering the image using a variable size/variable cutoff high pass filter that uses a square kernel. As one skilled in the art will know, a high pass filter with a square kernel determines if a pixel should be changed to, e.g., black or white, based on the value of that pixel compared to the average value of a square region around the pixel. The filter size is determined by the size of the image. The filtered image is then line thinned, producing lines with free ends shortened (i.e., "cleaned").

Although this reduces stray lines, it does not remove grid extension lines on the target. Line-thinning algorithms are well-known in the art. For example, such an algorithm is found in Arcelli, C., "Pattern Thinning by Contour Tracing", *Computer Graphics* and *Image Processing*, Vol. 17, 1981, pp. 130–144, which is herein incorporated by reference in its entirety. The image is searched systematically to locate grid patterns that might be part of the target. Only grid patterns of the proper dimension are considered (here, a 3×3 square grid). Once a target grid is located, the identification dots are searched for (e.g., dot 40 in FIG. 4). The dots confirm that the grid is part of the target, and uniquely identify the particular face and orientation of the target. This process is repeated until all the visible faces of the target have been identified.

After identifying the target in the image, two-dimensional coordinates are assigned to each visible target grid point in the image (STEP 63, "ASSIGN 2D COORDINATES"). The two-dimensional coordinates are assigned with reference to, for example, the upper left-hand corner of the digital image. In other words, these are the pixel coordinates.

Once the target has been identified for a given image and the two-dimensional coordinates assigned, the internal parameters of the image-obtaining device are determined (STEP 64, "DETERMINE IMAGE-OBTAINING DEVICE PARAMETERS"). In this case, the 11 standard camera parameters are used in direct linear transform equations. For a description of direct linear transform equations, see Marzan, G. T. and Karara, H. M., "A Computer Program For Direct Linear Transformation Solution of the Collinearity Condition, and Some Applications of It,"*Proc. ASP Symposium on Close-Range Photogrammetric Systems*, Ill. (1975), pp. 420–476 (hereinafter, "Marzan and Karara"), which is herein incorporated by reference in its entirety. In the present case, a CCD chip is used instead of film. For each 2D point, we have two equations:

$$X_iL_1+Y_iL_2+Z_iL_3+L_4-x_iX_iL_9-x_iY_iL_{10}-x_iZ_iL_{11}=x_i; \quad (1)$$

and $$X_iL_5+Y_iL_6+Z_iL_7+L_8-y_iX_iL_9-y_iY_iL_{10}-y_iZ_iL_{11}=y_i, \quad (2)$$

where $x_i$, $y_i$ are the 2D pixel coordinates, $X_i$, $Y_i$, $Z_i$, are the 3D coordinates, and $L_1$–$L_{11}$ are the 11 camera parameters. With a sufficient number of points, you have 11 equations and 11 unknowns ($L_1$–$L_{11}$). Additional points can be used to reduce the error of the solution.

A least-squares solution is made based on each of the two-dimensional coordinates for each grid point located on the target. For each face on target 24, there are 16 grid points, for a total of 32 or 48 grid points (either two or three sides may be visible, respectively) and 64 or 96 coordinates (one X and one Y coordinate for each grid point), respectively. Given equations (1) and (2) above, a least squares solution for parameters $L_1$–$L_{11}$ is given by:

For each point i, let

| | | | | | | |
|---|---|---|---|---|---|---|
| $l_{1i}=X_i$ | $l_{5i}=0$ | $l_{9i}=-x_iX_i$ | | $m_{1i}=0$ | $m_{5i}=X_i$ | $m_{9i}=-y_iX_i$ |
| $l_{2i}=Y_i$ | $l_{6i}=0$ | $l_{10i}=-x_iY_i$ | and | $m_{2i}=0$ | $m_{6i}=Y_i$ | $m_{10i}=-y_iY_i$ |
| $l_{3i}=Z_i$ | $l_{7i}=0$ | $l_{11i}=-x_iZ_i$ | | $m_{3i}=0$ | $m_{7i}=Z_i$ | $m_{11i}=-y_iZ_i$ |
| $l_{4i}=1$ | $l_{8i}=0$ | $l_{12i}=-x_i$ | | $m_{4i}=0$ | $m_{8i}=1$ | $m_{12i}=-y_i$ |

Then let the 12 × 11 matrix $M$ be $$M = \begin{bmatrix} \sum_i l_{1i}^2 + \sum_i m_{1i}^2 & \sum_i l_{2i}l_{1i} + \sum_i m_{2i}m_{1i} & \cdots & \sum_i l_{11i}l_{1i} + \sum_i m_{11i}m_{1i} & \sum_i l_{12i}l_{1i} + \sum_i m_{12i}m_{1i} \\ \sum_i l_{1i}l_{2i} + \sum_i m_{1i}m_{2i} & \sum_i l_{2i}^2 + \sum_i m_{2i}^2 & & \sum_i l_{11i}l_{2i} + \sum_i m_{11i}m_{2i} & \sum_i l_{12i}l_{2i} + \sum_i m_{12i}m_{2i} \\ \vdots & \vdots & & \vdots & \vdots \\ \sum_i l_{1i}l_{11i} + \sum_i m_{1i}m_{11i} & \sum_i l_{2i}l_{11i} + \sum_i m_{2i}m_{11i} & \cdots & \sum_i l_{11i}^2 + \sum_i m_{11i}^2 & \sum_i l_{12i}l_{11i} + \sum_i m_{12i}m_{11i} \end{bmatrix}$$

This matrix can then be row-reduced to solve for the $L_1$–$L_{11}$ parameters, which will be given in the final column.

Based on the least-squares solution, the asymmetric and first order symmetric lens distortion parameters are determined. The photogrammetry equations use a simple lens model. Real lenses differ from the simple lens model due to aberrations in the glass, chromatic aberrations, thick lenses, multiple lenses, and lens shape. Asymmetric and symmetric distortions can be used to modify pixel coordinates such that the simple lens model can still be used. The equations are given as:

$$x'' = x + \Delta x;$$

and $$y'' = y + \Delta y,$$

where $x''$, $y''$ are the coordinates which have been corrected for distortion, $x$, $y$, are the initial, uncorrected coordinates, and $\Delta x$, $\Delta y$ are the correction values. These correction values are given by the equations:

$$\Delta x = x' K_1 r^2 + P_1(r^2 + 2x'^2) + 2P_2 x' y';$$

and $$\Delta y = y' K_1 r^2 + P_2(r^2 + 2y'^2) + 2P_1 x' y',$$

where $$x' = x - x_0;$$

$$y' = y - y_0;$$

and $$r = x'^2 + y'^2,$$

where $x_0$, $y_0$ are the coordinates of the film center, as computed from the $L_1$–$L_{11}$ parameters, $K_1$ is the first symmetric distortion parameter, and $P_1$, $P_2$ are the asymmetric distortion parameters. A second least-squares solution is then obtained, taking into account the distortion parameters. The determination of distortion parameters and the second least-squares solution are iterated; if the solution does not converge with an acceptable number of iterations, the number of distortion parameters is reduced. Since $L_1$–$L_{11}$ are dependent on x, y and x, y are dependent on $K_1$, $P_1$, $P_2$, first $L_1$–$L_{11}$ are calculated assuming $K_1 = P_1 = P_2 = 0$. Then $K_1$, $P_1$, $P_2$ are calculated based on the $x_0$, $y_0$ determined from $L_1$–$L_{11}$. $L_1$–$L_{11}$ are recalculated based on the new $K_1$, $P_1$, $P_2$ parameters. $K_1$, $P_1$, $P_2$ and $L_1$–$L_{11}$ are then iteratively calculated. This is repeated until the values for $K_1$, $P_1$, $P_2$ and $L_1$–$L_{11}$ converge or some number of iterations have been done. If the solution converges, the values obtained are used for the camera parameters.

If the solution does not converge, the location of the target patterns is "improved" by fitting each set of grid points on a grid line to a least-squares fit line. The two-dimensional coordinates for the grid points are then recalculated from the intersections of the least-squares fit lines. If the lens can be accurately modeled with the simple lens model, then the grid lines of the target are guaranteed to be in a straight line in each of the images. Note that target pattern location improvement cannot be used with camera distortion correction, since the process averages some of the data needed to calculate distortion. After target pattern location improvement, the least-squares solution based on the two-dimensional coordinates is again calculated, with the resulting values being used for the camera parameters.

Optionally, the image reliability could be determined (STEP 66, "OPTIONAL IMAGE RELIABILITY DETERMINED"). Having determined the camera position, the direct linear transform equations and the lens distortion parameters specify where a grid point on the target should be within a photograph. For instance, suppose a grid point on the target is found at some x, y coordinate in the photograph. The camera parameters, $L_1$–$L_{11}$, are determined based on all of the target points which are found. Based on these camera parameters, one would expect the grid point on the target to be at some x', y'. The reliability would then be given as:

$$\frac{1}{\sqrt{(x-x')^2 + (y-y')^2}}. \tag{3}$$

The distance from the camera is calculated for each visible target grid point, and the inverse of the sum of the squares of these distances provides the reliability. An infinite reliability (i.e., 1/0 in equation (3) above) would indicate a perfect match between the target grid points in the image and the calculated camera position.

After the image-obtaining device parameters are determined, the location of the grid on the surface of interest is determined (STEP 68, "LOCATE GRID ON SURFACE"). In the present example, the user identifies the area of the image including part 10 for the current image. If there are any problems with the grid in the image, e.g., broken grid lines due to abrasion or a low quality initial grid application, or stray lines from various causes, the user fixes them manually. However, if the grid lines are clearly contrasted with the surface they are on, there should be no problems to fix. The identified grid is then line thinned and cleaned in a manner similar to that for the target, except that stray loops caused by glare or scratches on the part are also removed. After the user identifies a known point on the surface grid pattern, the computer locates the grid pattern and assigns two-dimensional coordinates to each grid point, as with the target.

The previous steps are then repeated for each of at least two images taken of the surface of interest and the target (INQUIRY 70, "LAST IMAGE?").

If there are no more images to process, three-dimensional coordinates for the grid on the surface of interest are determined (STEP 72, "DETERMINE 3D COORDINATES FOR SURFACE"). Here, the three-dimensional coordinates are determined by the computer after the user specifies which photographs are to be used. Using the grid located on the surface of interest, the grid is registered (i.e., aligned) to a specific number scheme. In other words, the two-dimensional coordinates for the images are correlated. The number scheme determines which grid points appear in which photograph(s). Direct linear transform equations are then written in terms of the three-dimensional coordinates. A least-squares solution is made based on each of the two-dimensional coordinates in each photograph. Weighing, based on the particular photograph's reliability could be employed. The least squares solution is repeated for each grid point that appears in at least two photographs. Finally, the registered grid is used to determine three-dimensional connectivity between the grid points. The three-dimensional coordinates are calculated using a least-square method employing the discrete linear transform method discussed in Marzan and Karara. When only two images are used, employing both x and y coordinates from the first image and only the x coordinates from the second image, the Marzan and Karara method produces similar results compared with the Vogel patent.

The Marzan and Karara method will now be briefly described. Instead of using physical camera parameters, as used in the Vogel patent, the Marzan and Karara method uses a set of linear parameters. These linear parameters can be determined from the physical parameters. Use of the linear parameters is more computationally efficient than use of the physical parameters, and facilitates using a least-squares approach to improve the results based on redundant data. The equations involved are shown below.

For each two-dimensional point $i$ in photograph $j$, let:

$$l_{1ij} = L_{1j} - x_{ij}L_{9j} \quad m_{1ij} = L_{5j} - y_{ij}L_{9j}$$
$$l_{2ij} = L_{2j} - x_{ij}L_{10j} \quad m_{2ij} = L_{6j} - y_{ij}L_{10j}$$
$$l_{3ij} = L_{3j} - x_{ij}L_{11j} \quad m_{3ij} = L_{7j} - y_{ij}L_{11j}$$
$$l_{4ij} = x_{ij} - L_{4j} \quad m_{4ij} = y_{ij} - L_{8j}$$

where $L_1, L_2, \ldots, L_{11}$ are the 11 parameters determined for a photograph based on the located point on the target, and $x_i$, $y_i$ are the pixel coordinates of a point whose three-dimensional coordinates are to be determined.

Then for each point $i$, let the $4 \times 3$ matrix $M_i$ be $$M_i = \begin{bmatrix} \sum_j l_{1ij}^2 + \sum_j m_{1ij}^2 & \sum_j l_{2ij}l_{1ij} + \sum_j m_{2ij}m_{1ij} & \sum_j l_{3ij}l_{1ij} + \sum_j m_{3ij}m_{1ij} & \sum_j l_{4ij}l_{1ij} + \sum_j m_{4ij}m_{1ij} \\ \sum_j l_{1ij}l_{2ij} + \sum_j m_{1ij}m_{2ij} & \sum_j l_{2ij}^2 + \sum_j m_{2ij}^2 & \sum_j l_{3ij}l_{2ij} + \sum_j m_{3ij}m_{2ij} & \sum_j l_{4ij}l_{2ij} + \sum_j m_{4ij}m_{2ij} \\ \sum_j l_{1ij}l_{3ij} + \sum_j m_{1ij}m_{3ij} & \sum_j l_{2ij}l_{3ij} + \sum_j m_{2ij}m_{3ij} & \sum_j l_{3ij}^2 + \sum_j m_{3ij}^2 & \sum_j l_{4ij}l_{3ij} + \sum_j m_{4ij}m_{3ij} \end{bmatrix}$$

This is a standard least-squares solution to the pair of equations:

$$(L_{1j}-x_{ij}L_{9j})X_i + (L_{2j}-x_{ij}L_{10j})Y_i + (L_{3j}-x_{ij}L_{11j})Z_i + L_{4j} = x_{ij};$$

and $$(L_{5j}-y_{ij}L_{9j})X_i + (L_{6j}-y_{ij}L_{10j})Y_i + (L_{7j}-y_{ij}L_{11j})Z_i + L_{8j} = y_{ij},$$

with each two-dimensional point located to equal precision.

If the matrix $M_i$ is row reduced, the rightmost column of the matrix will be the three-dimensional coordinates of point $i$, $X_i$, $Y_i$, and $Z_i$.

After the three-dimensional coordinates are determined, the strain, if desired, can be calculated, based on the three-dimensional coordinates and the grid size (STEP 74, "CALCULATE STRAIN"). The computation of strain from measured coordinates has generally been described in the Vogel patent. Here, the grid size was input by the user in STEP 60. After the strain is calculated, one could, for example, display strain contours of the surface for various uses.

Accuracy of the present surface attribute determination system is dependent on several factors, including: the resolution of the image obtaining equipment, the precision of the photogrammetry target, the number of images obtained, and the size of the target within each image. Thus, the accuracy of the system can be somewhat suited to the needs of the user by affecting one or more of these factors.

In the above example, a particular camera was used. Due to expense or accuracy concerns, a camera with greater or less resolution may be desired. If the resolution of the photographs is doubled (e.g., doubling the number of pixels across), the accuracy of the measurements also doubles. However, since doubling the number of pixels across quadruples the overall number of pixels, this would increase the processing requirements by a factor of four.

The precision of the photogrammetry target is another factor in the accuracy of the present invention. For automatic location of the target by computer, the grid lines must be clearly discernable from the rest of the target. Further, the accuracy of the grid lines and the number of visible grid points have a direct effect on the accuracy of the results. For example, the more target grid points that are visible in an image, the more accurate the results will be. However, as the number of grid points increases, so does the amount of work the computer has to do to identify the target. It is estimated that, aside from the effort needed by the computer, if the number of visible target grid points exceeds 500, no significant benefit is obtained. In addition, recall that at least six visible target grid points are needed to determine the parameters of the image-obtaining device. With the present exemplary algorithms used to locate the target, a cube target with 49 grid points per side is the practical limit. This would increase the accuracy by a factor of about 1.5 over a cube target with 16 grid points per side, but would also increase the likelihood that the computer may not be able to locate the target.

The number of images obtained has a simple and substantial effect on the accuracy of the measurements. Accuracy increases half as much as the number of images. For example, if the number of images is quadrupled, the accuracy doubles. However, processing time is directly related to the number of photographs. Thus, a compromise will have to be made in a given situation between accuracy and efficiency.

The size of the target with respect to the size of the image also has a significant effect on the accuracy of the surface attribute measurement. In the example above, the target was a 25 mm cube, which was about ⅙ the field of view of the digital camera lens. In general, it has been found that doubling the target size quadruples the accuracy of the measurement. Note that doubling the target size actually quadruples the area it occupies for a photograph with the same field of view. Where the target size is more than 0.6 times the size of the image, no significant accuracy improvement is expected.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method of determining an attribute of a surface, comprising steps of:

applying a first plurality of identifiable reference points to the surface;

placing a photogrammetry target on or in close proximity to the surface, the photogrammetry target including a second plurality of identifiable reference points;

obtaining at least two images of the surface with the photogrammetry target, each image including at least some of the first plurality of identifiable reference points and the second plurality of identifiable reference points; and determining, from the at least two images, the attribute based on the at least some of the first plurality of identifiable reference points and the second plurality of identifiable reference points.

2. The method of claim 1, wherein the attribute comprises a profile of the surface, and wherein the step of applying comprises projecting the first plurality of identifiable reference points onto the surface.

3. The method of claim 1, wherein the step of determining comprises steps of:

determining, for each image, two-dimensional coordinates for each visible reference point;

correlating the two-dimensional coordinates determined for the at least two images;

determining, for each image, a distance between a vantage point for obtaining the image and the photogrammetry target; and determining, for each image, three-dimensional coordinates for each visible reference point in the first plurality of identifiable reference points based on the correlated two-dimensional coordinates and the determined distance.

4. The method of claim 3, wherein each image includes at least two sides of the photogrammetry target, and wherein the step of determining three-dimensional coordinates comprises employing triangulation.

5. The method of claim 3 wherein the step of determining three-dimensional coordinates comprises employing direct linear transform equations.

6. The method of claim 1 wherein the step of obtaining comprises taking at least two photographs.

7. The method of claim 6 further comprising a step of digitizing the at least two photographs.

8. The method of claim 1 wherein the step of obtaining comprises taking at least two digital photographs.

9. The method of claim 1 wherein the step of determining is performed by a computer.

10. The method of claim 1, wherein the surface comprises a deformed surface, wherein the attribute comprises surface strain, and wherein the step of applying comprises printing the first plurality of identifiable reference points on the surface prior to deformation.

11. The method of claim 1, wherein the step of obtaining comprises obtaining each of the at least two images from a different vantage point.

12. The method of claim 1, wherein the step of applying comprises applying a first grid pattern including a first plurality of grid points, and wherein the photogrammetry target includes a second grid pattern including a second plurality of grid points.

13. Apparatus for determining an attribute of a surface, comprising:

means for applying a first plurality of identifiable reference points to the surface;

a photogrammetry target for placing on or in close proximity to the surface, the photogrammetry target including a second plurality of identifiable reference points;

means for obtaining at least two images of the surface with the photogrammetry target, each image including at least some of the first plurality of identifiable reference points and the second plurality of identifiable reference points and having a different orientation; and means for determining, from the at least two images, the attribute based on the at least some of the first plurality of identifiable reference points and the second plurality of identifiable reference points.

14. The apparatus of claim 13 wherein the applying means comprises means for applying a first grid pattern including a first plurality of grid points to the surface.

15. The apparatus of claim 13 wherein the applying means comprises means for projecting an image of the first plurality of identifiable reference points onto the surface.

16. The apparatus of claim 13 wherein the photogrammetry target has a cube shape.

17. The apparatus of claim 13, wherein the obtaining means comprises a digital camera and wherein the second plurality of identifiable reference points comprises at least six reference points of known position with respect to each other.

18. The apparatus of claim 13 wherein each of the first plurality of identifiable reference points and the second plurality of identifiable reference points comprises a square grid pattern with grid points.

19. The apparatus of claim 13 wherein the computer determining means comprises a computer.

20. The apparatus of claim 19 wherein the computer is programmed to:

calculate, for each image, two-dimensional coordinates for each visible reference point;

correlate the two-dimensional coordinates calculated for the at least two images;

calculate, for each image, a distance between a vantage point for obtaining the image and the photogrammetry target; and calculate, for each image, three-dimensional coordinates for each visible reference point in the first plurality of identifiable reference points based on the correlated two-dimensional coordinates and the determined distance.

21. The apparatus of claim 13, wherein the obtaining means is portable.

* * * * *

UNITED STATES PATENT AND TRADEMARK OFFICE
CERTIFICATE OF CORRECTION

PATENT NO. : 5,642,293
DATED : Jun. 24, 1997
INVENTOR(S) : Manthey et al.

It is certified that error appears in the above-identified patent and that said Letters Patent is hereby corrected as shown below:

Column 12, lines 46-47,
"the computer determining" should read — the determining—

Signed and Sealed this

Fourth Day of November, 1997

Attest:

BRUCE LEHMAN

Attesting Officer

Commissioner of Patents and Trademarks